United States Patent
Kojima et al.

[11] Patent Number: 6,009,913
[45] Date of Patent: Jan. 4, 2000

[54] LUBRICANT SURFACE-TREATED STEEL PIPE FOR HYDROFORMING USE

[75] Inventors: Masayasu Kojima, Tkarazuka; Kenji Ikisima, Kobe; Ken Tomiyasu, Nishinomiya, all of Japan

[73] Assignee: Sumitomo Metal Industries, Ltd, Osaka, Japan

[21] Appl. No.: 08/964,915

[22] Filed: Nov. 5, 1997

[30] Foreign Application Priority Data

Nov. 7, 1996 [JP] Japan ................... 8-295168
Nov. 7, 1996 [JP] Japan ................... 8-295253

[51] Int. Cl.$^7$ .................................. F16L 9/147
[52] U.S. Cl. .................... 138/146; 138/145; 138/143
[58] Field of Search .................... 138/143, 145, 138/146

[56] References Cited

U.S. PATENT DOCUMENTS

| | | | |
|---|---|---|---|
| 2,646,822 | 7/1953 | Ferguson | 138/145 |
| 3,356,108 | 12/1967 | Johnston | 138/143 |
| 3,422,856 | 1/1969 | Hunter et al. | 138/143 |
| 3,719,541 | 3/1973 | Takahashi et al. | 156/272 |
| 4,421,569 | 12/1983 | Dichter et al. | 138/145 |
| 4,481,239 | 11/1984 | Eckner | 138/145 |
| 4,499,136 | 2/1985 | Nakamura et al. | 428/206 |
| 4,510,007 | 4/1985 | Stucke | |
| 5,207,248 | 5/1993 | Seki et al. | 138/143 |
| 5,385,655 | 1/1995 | Brent et al. | 204/181.1 |
| 5,484,541 | 1/1996 | Przybylski et al. | |

FOREIGN PATENT DOCUMENTS

| | | |
|---|---|---|
| 0 357 508 A1 | 3/1990 | European Pat. Off. |
| 196 16 326 A1 | 11/1996 | Germany |
| 55-115474 | 9/1980 | Japan |
| 58-168420 | 10/1983 | Japan |
| 59-29147 | 2/1984 | Japan |
| 7-195615 | 8/1995 | Japan |

OTHER PUBLICATIONS

Patent Abstracts of Japan, vol. 014, No. 052 (M–0928), Jan. 30, 1990; and JP 01 280545 A (Nippon Steel Corp), Nov. 10, 1989.

*Primary Examiner*—James F. Hook
*Attorney, Agent, or Firm*—Armstrong, Westerman, Hattori, McLeland and Naughton

[57] ABSTRACT

A lubricant surface-treated steel pipe for hydroforming use in which at least its outer surface is coated with a lubricating organic resin to a thickness of 0.5 $\mu$m to 100 $\mu$m. The surface-treated steel pipe provides excellent prevention of galling and excellent lubrication in hydroforming. Also, hydroforming can be started immediately after the surface-treated steel pipe is cut into short pieces.

12 Claims, 3 Drawing Sheets

LUBRICANT SURFACE-TREATED STEEL PIPE FOR HYDROFORMING USE

BACKGROUND OF THE INVENTION

1. Field of the Invention

The present invention relates to a lubricant surface-treated pipe for hydroforming use having excellent lubrication for hydroforming.

2. Description of the Related Art

Hydroforming of a steel pipe is known as a typical method for forming T-shaped pieces (hereinafter referred to as T pieces) to be used at branches of piping.

Drawings will be referred to for explaining the general structure of T pieces and conventionally-recognized problems.

FIGS. 1A and 1B show a T piece, wherein FIG. 1A shows a side view and FIG. 1B shows a sectional view taken along line A—A of FIG. 1A. A T piece 1 includes a trunk 1a and a branch 1b, having a height H, which merge together through a crotch 1c, having a smooth curvature (radius R).

FIGS. 2A and 2B show dies used for hydroforming a T piece, wherein FIG. 2A shows a longitudinal sectional view and FIG. 2B shows a side view. Dies 2 include an upper die 2a and a lower die 2b which are vertically separable from each other.

A semicircular groove 2a-1 is formed in the upper die 2a, whereas a semicircular groove 2b-1 and a hole 2b-2 are formed in the lower die 2b. The shape of the thus-formed die cavity is identical to the profile of the T piece 1. The dies 2 are generally of a tool steel. The surface of the die cavity is smoothly finished and is hardened through heat treatment or chromium-plating.

FIGS. 3A to 3D show the steps of hydroforming a T piece.

In a step shown in FIG. 3A, a tubular blank 3, having a predetermined length $L_0$ is set in the dies 2 of a hydroforming machine (not shown). An outer diameter D1 and a wall thickness $t_a$ of the tubular blank 3 are identical to those of a product T piece. A tubular blank is a short piece of pipe obtained by cutting a long steel pipe into pieces, each having such a length as to be accommodated in the hydroforming dies. The tubular blank 3 is set in the groove 2b-1 of the lower die 2b, and then the upper die 2a attached to the vertically pressing apparatus of a hydroforming machine (not shown) is lowered, thereby setting the tubular blank 3 in the dies 2. In order to hold the upper die 2a in position during hydroforming, the upper die 2a is pressed against the lower die 2b by a predetermined force.

In a step shown in FIG. 3B, opposed pushing blocks 4 and 5 attached to the horizontally pressing apparatus of a hydroforming machine (not shown) are advanced to press the end surfaces 4a and 5a thereof against the end surfaces 3a of the tubular blank 3. Then, the tubular blank 3 is filled with a hydraulic fluid 8 injected through a hydraulic fluid path 6. The hydraulic fluid is usually of an emulsion prepared through combination of water with oil, which oil is intended primarily for rust prevention. Subsequently, while the pressure of the hydraulic fluid 8 is increased, the pushing blocks land 5 are advanced. As a result, the tubular blank 3 begins to deform along the round (R) portion 2b-3 of the hole 2b-2 of the lower die 2b, so that part of the tubular blank 3 begins to project into the hole 2b-2.

In a step shown in FIG. 3C, the tubular blank 3 is contracted to a length L' slightly longer than the length of the trunk of a product T piece, and a projected portion 9b is formed against the hole 2b-2 and a stopper 7 set in a predetermined position. Thereafter, the pressure of the hydraulic fluid 8 is reduced, the pushing blocks 4 and 5 are retreated, and the upper die 2a is raised. The stopper 7 is raised by a cylinder (not shown) to thereby eject a semifinished product 9 from the lower die 2b.

FIG. 3D shows a side view of the semifinished product 9. The projected portion 9b is cut at a height H, and a trunk 9a is finished to a length L, followed by heat treatment, as needed, to thereby obtain a T piece.

In the steps shown in FIGS. 3A to 3C, the hydraulic fluid 8 applies to the tubular blank 3 a pressure ranging from hundreds of atmospheres to one thousand and several hundreds of atmospheres. In addition, the pushing blocks 4 and 5 apply a compressive force to the tubular blank 3. Accordingly, a high pressure acts on the outer surface of the tubular blank 3 and the groove 2a-1 of the upper die 2a and the groove 2b-1 of the lower die 2b.

Also, a high pressure acts on the R portion 2b-3 of the hole 2b-2 of the lower die 2b along which the work-hardened tubular blank 3 slides. Under these circumstances, the following problems arise in association with the friction induced between the tubular blank 3 and the die surface when the tubular blank 3 is compressed in an axial direction in the die grooves 2a-1 and 2b-1, or when part of the tubular blank 3 projects into the die hole 2b-2.

First, scratches are formed in the outer surface of the semifinished product 9, and these must be removed by polishing with a grinder or the like. A mentioned previously, the cavity of the dies 2 is finished hard and smooth. However, since hydroforming involves severe friction, repeated hydroforming results in the formation of scratches even in the dies 2. Correction of the die surface through polishing reduces production efficiency, and repeated correction results in a change of dimensions of a product. In such a case, the corrected portion of the die surface must be padded and finished, resulting in an increase in maintenance cost.

Second, since the tubular blank 3 is difficult to slide in an axial direction, the tubular blank 3 is likely to buckle in the vicinity of end portions thereof. Thus, hydroforming a thin-walled product is difficult.

FIG. 4 shows a buckled tubular blank 3. As shown in FIG. 4, buckling 10 is likely to occur in the vicinity of end portions of the tubular blank 3.

Third, since part of the tubular blank 3 becomes difficult to project into the die hole 2b-2, the projected portion 9b is likely to crack.

FIG. 5 shows the cracked projected portion 9b. As shown in FIG. 5, a crack 11 occurs in the top area of the projected portion 9b when the tubular blank 3 becomes difficult to project into the die hole 2b-2.

In solving the above problems involved in hydroforming, it is important to reduce frictional resistance involved in sliding motion between a tubular blank and dies under a very high surface pressure.

In order to reduce such frictional resistance, the outer surface of a tubular blank is treated against galling to the die surface. A lubrication oil may be applied onto the outer surface of a tubular blank, but this method is relatively ineffective because the lubrication oil is rubbed off due to sliding under a high surface pressure between the tubular blank and the dies. Also, a water-based hydraulic fluid used for applying an internal pressure to a tubular blank accommodated in dies may deteriorate the effect of a lubrication oil.

Accordingly, anti-galling paint is commonly employed. A tubular blank obtained by cutting a pipe to a predetermined length is degreased and then paint is applied on the outer surface thereof by spraying or brushing. After the applied paint is sufficiently dried and solidified, hydroforming is performed.

However, this method involves the following problems.

First, the degreasing and painting of a tubular blank require corresponding labor or man-hours. Since painting a long pipe it is difficult, the pipe is cut into tubular blanks, each having a predetermined length, and then each of the tubular blanks is painted. In this case, the step of cutting a pipe into tubular blanks cannot be continuously linked to a hydroforming step. Accordingly, material stagnates between steps, requiring an excess space for storing material and impairing the overall efficiency of a hydroforming system.

Second, since each of the tubular blanks, which are cut into a predetermined length from a long steel pipe, is painted by hand, such painting requires not only painting time, but also skill to paint the curved surface of a tubular blank to a uniform thickness. In the case of a thin-walled tubular blank, if the painting thickness is nonuniform, the tubular blank will be highly likely to buckle at a portion where the painting thickness changes, while being compressed in a longitudinal direction thereof during hydroforming. When the coating of paint is excessively thick, the coating of paint will adhere to the die surface. Such adhering paint will dimple on the surface of a product in the next hydroforming process. Accordingly, upon completion of hydroforming, such adhering paint must be removed before the next hydroforming process starts, thus wasting time and labor.

Third, in painting, paint is likely to adhere thick to part of the end surface of a tubular blank. This may disable sealing at the end surface of a tubular blank when a hydraulic fluid is injected into the tubular blank for hydroforming as shown in FIG. 3C. Accordingly, before hydroforming is started, the end surfaces of a tubular blank must be visually checked, and any adhering paint must be removed therefrom.

Fourth, when the coating of paint must be removed through use of an organic solvent after hydroforming is completed, much labor and time is required. Also, a problem in working environment may arise.

SUMMARY OF THE INVENTION

In view of the foregoing, an objective of the present invention is to provide a lubricant surface-treated steel pipe for hydroforming use characterized in the following.

a) A long pipe whose surface is coated with a resin. Accordingly, hydroforming can be started immediately after the long pipe is cut into tubular blanks.

b) Galling is effectively prevented, and excellent lubrication is provided.

c) Through selection of an appropriate type of resin coating, the coating may be utilized intact or may be removed after hydroforming, as needed. Coating can be readily removed through alkaline degreasing.

To achieve the above objective, the present invention provides:

1) A lubricant surface-treated steel pipe for hydroforming use, comprising a steel pipe and a lubricating organic resin coating provided on at least an outer surface of the steel pipe, the coating having a thickness of 0.5 $\mu$m to 100 $\mu$m; and 2) A lubricant surface-treated steel pipe for hydroforming use, comprising a steel pipe, a pre-treatment layer provided on at least an outer surface of the steel pipe, and a lubricating organic resin coating provided on the surface treatment layer, the coating having a thickness of 0.5 $\mu$m to 100 $\mu$m.

DETAILED DESCRIPTION OF THE INVENTION

Figures 1A, 1B:
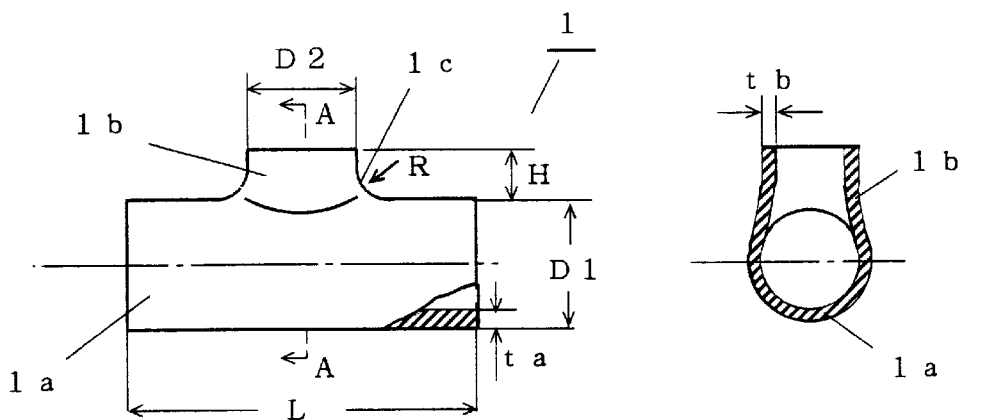
FIG. 1A is a side view showing a T piece.
FIG. 1B is a sectional view taken along line A—A of FIG. 1A.
Figures 2A, 2B:
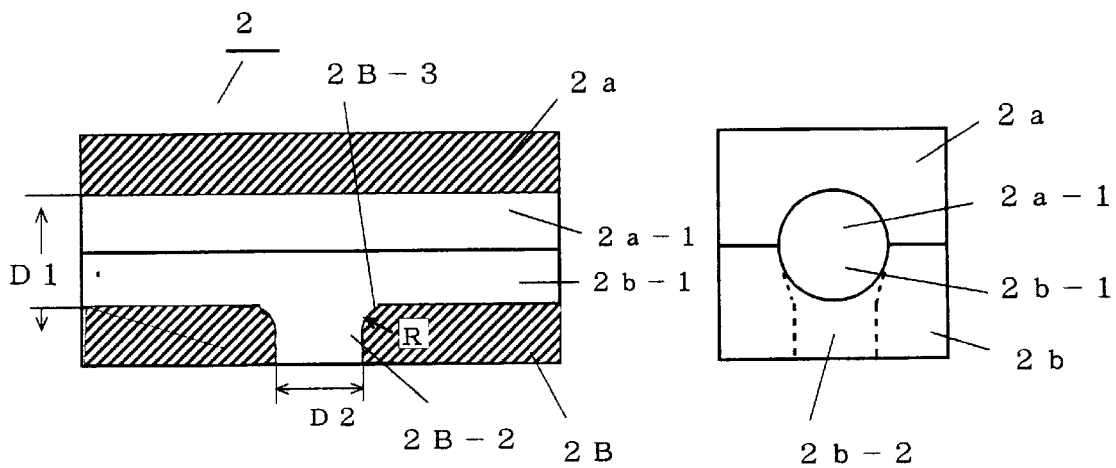
FIG. 2A is a longitudinal sectional view showing dies used for hydroforming a T piece.
FIG. 2B is a side view showing the dies of FIG. 2A.

Limiting conditions for a lubricant surface-treated steel pipe for hydroforming use of the present invention will now be described in detail.

(a) Organic resin coating (hereinafter referred to as a resin coating)

The present inventors have found that using a resin coating as a lubricant is an optimum way to cope with severe sliding conditions between dies and an object material in hydroforming.

In order to prevent galling, scratches, buckling, cracking, and like problems in hydroforming through attainment of appropriate lubrication, a resin coating is provided on at least the outer surface of a steel pipe. This coating functions as a spacer to prevent the direct metal-to-metal contact between dies and a steel pipe.

For a hydroformed product, the resin coating may be left on the surface thereof or it may be removed from the surface thereof. Accordingly, when a resin coating is to be removed from the product surface, the resin must be easily removed. A resin coating intended to be removed from the surface of a hydroformed product is called a removable resin coating. A resin coating not intended to be removed from the surface of a hydroformed product is called a non-removal resin coating.

First, a non-removal resin coating will be described below.

An organic resin to be used as a material for a non-removal resin coating may be of the thermosetting or radiation curing type. Specific example of such an organic resin include acrylic, urethane, polyester, and epoxy. Further, these resins may be cross-linked through use of an appropriate crosslinker. Examples of a crosslinker include amino resins and epoxy resins. Also, an acrylic resin prepared resin prepared through polymerization primarily of acrylic acid and methacrylic acid may be thermoset through the use of methyl alcohol- or butyl alcohol-modified melamine.

An organic resin coating used in the present invention may contain additives such as lubricants, pigments, and rust preventives in order to improve the physical properties thereof.

A resin coating must have pressure resistance and adhesion. In hydroforming, the surface pressure between an object material and dies may reach thousands of atmospheres. The pressure resistance of a coating is evaluated in terms of hardness. It is desirable for resin coating to have pencil hardness H or higher as specified in JIS K5400-6.14. In hydroforming, working heat and frictional heat cause the surface temperature of an object material to rise. Usually, the surface temperature of a carbon steel pipe rises to approximately 40° C. to 60° C., and that of a stainless steel pipe rises to approximately 70° C. to 90° C. As mentioned previously, an emulsion is used as a hydraulic fluid, so that water is present between the dies and the object material. Accordingly, a coating must maintain adhesion in a heated moist state.

Generally, a resin coating, which is primarily formed from high polymers, decreases in modulus of elasticity and adhesion at high temperatures. Particularly, at a temperature not lower than a glass transition temperature, these properties deteriorate significantly. Accordingly, the glass transition temperature of a resin coating is desirably 40° C. or higher.

However, if the glass transition temperature of a resin coating is excessively high, the resin coating may crack during hydroforming. Thus, the glass transition temperature must be not higher than 120° C., preferably 50° C. to 100° C., more preferably 60° C. to 90° C.

In order to improve the adhesion between a resin coating and a steel pipe, before application of a resin, the surface of the steel pipe is preferably acid-cleaned or subjected to blast treatment.

A resin coating is usually provided on the outer surface of a steel pipe so as to provide good lubrication between dies and the steel pipe in hydroforming, but may also be provided on the inner surface of the steel pipe. Application of a resin onto the inner surface of a steel pipe is primarily intended for rust prevention of the steel pipe before and after hydroforming.

After a steel pipe coated with an organic resin is hydroformed, the organic resin coating remains on the hydroformed product. Since this coating has a rust-preventive function, the coating may be utilized as a rust-preventive coating. If the inner surface of the steel pipe to be hydroformed is also coated with the organic resin, the inner surface of the hydroformed product will also be prevented from rusting.

When a resin coating is not to be removed after hydroforming, the surface treatment of a steel pipe, which will be described later, provides the excellent time-course adhesion between the steel pipe surface and the resin coating. Of course, a hydroformed product may receive finish coating as needed.

Because a resin can be applied onto a long steel pipe, hydroforming can be started immediately after the coated long steel pipe is cut into tubular blanks. In other words, the conventional coating and drying steps subsequent to the step of cutting a steel pipe into tubular blanks are not necessary. Also, no extra work to remove adhering paint from end surfaces of tubular blanks in order to establish sealing in hydroforming is necessary.

When an organic coating is not sufficiently lubricated due to severe hydroforming conditions, the organic coating will preferably contain an organic lubricant (e.g. polyethylene wax or fluoroplastic grains) in an amount of 0.5 wt. % to 20 wt. % in solid term. Also, adding pigments to an organic coating improves Next, a removable resin coating will be described.

When a resin coating is to be removed after hydroforming, a removable resin coating is used, a referred removable resin coating is thermoplastic type and, soluble in an alkali aqueous solution.

For a hydroformed semifinished product, a resin coating is removed for the purpose of obtaining good coating properties for subsequent coating. For a hydroformed product, a resin coating is removed for the purpose of obtaining good appearance, through the removal of the coating, which has become cloudy due to sliding in hydroforming and of obtaining cleanliness through the advance removal of the coating, which would otherwise exfoliate bit by bit in a certain working environment of the product.

On the other hand, a resin coating must sufficiently adhere to the surface of a tubular blank so as to lubricate appropriately during hydroforming. In order to meet both requirements for removal and adhesion, preferred applicable resins are vinyl resins or carboxyl-group-containing vinyl copolymers having an acid value of 10 to 160 or esters or amides of such resins.

An acid value of less than 10 associated with the carboxyl groups causes a resin coating to become less soluble in an aqueous alkali solution, whereas an acid value in excess of 160 impairs the water resistance of a resin coating. Particularly preferred applicable resins are homopolymers of polyacrylic acid or polyacrylic acid esters, or copolymers of these resins and other appropriate resins that are copolymerizable therewith, and have an acid value of 10 to 160.

Applicable resins preferably have flexibility so as to follows the plastic working of a tubular blank and a glass transition temperature of 5° C. to 100° C. If the glass transition temperature is less than 5° C., the resin will be disadvantageous for storage and handling due to stickiness thereof. For resins having a glass transition temperature in excess of 100° C. a stress induced within the resin coating transition temperature in excess of 100° C., a stress, induced within the resin coating during hydroforming, overcomes the adhesion between the coating and the metal surface, involving the potential galling between dies and the tubular blank, due to the cracking or exfoliation of the coating. The glass transition temperature preferably ranges from 60° C. to 90° C.

As mentioned previously, additives such as lubricants, pigments, and rust preventives may be added to a resin to control coating performance.

As lubricants to be added together with other additives, solid lubricants such as wax and metallic soap, are preferred. In order to cope with hydroforming of a high degree of working or difficult hydroforming, metallic soap is particularly preferred because it is adsorbed into the surface of a tubular blank. Further, since metallic soap is soluble in an alkali aqueous solution, it becomes easier to remove the resin coating after hydroforming.

By contrast, wax or inorganic solid lubricants are not preferred, since they hinder the removal of the resin coating, and particularly inorganic solid lubricants having a large specific gravity, impair the stability of dispersion of a lubricant solution.

Applicable metallic soap may include esters of fatty acid, phosphoric esters, and sulfic esters. These kinds of metallic soap are preferably slightly soluble in water. Examples of such metallic soap include Ca salts and Zn salts. K salts and Na salts are not preferred, since they impair the water resistance and corrosion resistance of a coating.

Metallic soap is added preferably in an amount of 1% to 20% inclusive. When metallic soap is added in an amount of less than 1%, sufficient lubrication is not obtained. When metallic soap is added in excess of 20%, the water resistance of a coating is impaired, and manufacturing performance is also impaired due to foaming at the time of application.

A removable resin coating must have a uniform thickness. Methods of forming a removable resin coating on a long steel pipe include the following: a steel pipe is immersed in a resin solution and then dried; a resin is sprayed onto a steel pipe and then dried; and a resin is brushed onto a steel pipe and then dried. A steel pipe covered with such a removable resin coating is hydroformed and then alkaline-degreased to thereby remove the coating therefrom. Subsequently, the stripped steel pipe may be coated again as needed.

Hydroforming does not require the inner surface of a tubular blank to be coated with a lubricating resin. When a steel pipe is immersed in a resin solution so as to form a resin coating on the surface thereof, a resin coating is also formed on the inner surface thereof; however, the inner coating has no effect on hydroforming. In the case of a carbon steel pipe, the inner resin coating will prevent the pipe surface from rusting.

(b) Thickness of an organic resin coating

In the case of a non-removal resin coating, an excessively thin coating is likely to cause scratches in the outer surface of a steel pipe and the galling between dies and the pipe surface. Dies for hydroforming use have a complicated profile of cavity. Accordingly, even when the surface of the die cavity is carefully polished, the maximum surface roughness Rmax is not better than approximately 2 $\mu$m. For such a level of surface roughness, the coating thickness must be at least 1 $\mu$m. By contrast, when the coating thickness is in excess of 100 $\mu$m, a coating tends to exfoliate easily due to an internal stress thereof. Exfoliations of coating adhere to the die surface. Such adhering coating will dimple the surface of a steel pipe or function as a starting point of buckling in the next hydroforming. Also, economically, an excessively thick coating is wasteful. Accordingly, the thickness of a resin coating is set at 0.5 $\mu$m to 100 $\mu$m. When a resin coating is not to be removed after hydroforming, the coating thickness is preferably 30 $\mu$m to 90 $\mu$m, more preferably 30 $\mu$m to 50 $\mu$m.

For hydroforming, a resin coating must be relatively thick as described above. Such a thick resin coating may be formed by repeating the application of a resin and drying.

Since the thickness of a resin coating must be as uniform as possible, a resin dissolved in a solvent or water is applied preferably by spraying, and a solid resin is applied preferably through the electrostatic spraying of powder of the resin. After a resin dissolved in a solvent or water is applied, forced drying is performed to evaporate a solvent or water. In order to dry an applied resin coating, the coated steel pipe may be heated through use of hot wind or induction heating. When a radiation curing coating is used, the driving time can for example be reduced through use of ultraviolet rays.

A lubricating removable resin coating must be provided on at least the outer surface of a steel pipe in a thickness of 0.5 $\mu$m to 10 $\mu$m inclusively, however, a thickness of 1 $\mu$m to 5 $\mu$m is preferred. When the coating thickness is less than 0.5 $\mu$m, a sufficient anti-galling effect is not obtained. When the coating thickness is in excess of 10 $\mu$m, the exfoliation of the coating will frequently occur due to an internal stress induced within the coating. Exfoliations of coating adhere to the die surface, causing dimple defect to be formed on the surface of a steel pipe in the next hydroforming. Further, this impairs hydroforming performance and degreasing performance. Also, economically, an excessive coating thickness is wasteful.

(c) A pre-treatment layer for a resin coating

A pre-treatment layer is provided as needed. When the deformation resistance or the degree of working of a tubular blank is relatively large, a pre-treatment layer for a resin coating is preferably provided on a steel pipe in order to strengthen the adhesion between the resin coating and the steel pipe.

A surface treatment layer is provided through phosphate treatment or chromate treatment which is usually applied before coating.

When a pre-treatment layer is excessively thick, a coating tends to easily exfoliate. Preferably, zinc phosphate is applied in an amount of not greater than 1 g/m$^2$; iron phosphate is applied in an amount of not greater than 0.3 g/m$^2$; and chromate is applied in a mount of not greater than 500 mg/m$^2$ in chromium term.

In phosphating or reactive chromate treatment, a steel pipe is immersed in a treatment solution for a predetermined time and is then washed with water and dried to thereby form a surface treatment layer on the steel pipe. In application type chromate treatment, a treatment solution is sprayed or brushed onto the surface of a steel pipe, followed by forced drying at a temperature of about 100° C.

(d) Steel pipe

Examples of a material for a steel pipe include, but are not limited to, carbon steel, austenitic stainless steel, and ferritic stainless steel.

Surface-treated steel pipes of this invention are suitable for hydroforming various steel components used in automotive body such as lower arms, suspension members center pillars and so on.

EXAMPLE 1

Fourteen (14) seam welded steel pipes (outer dia. 89.1 mm, thickness 4.2 mm, length 5.5 m) manufactured from hot-rolled steel strip (carbon steel: C 0.05%, Si 0.1%, Mn 0.25%) were acid cleaned and were then coated with an acrylic thermosetting coating material through use of a spray. The 14 steel pipes were coated in different thicknesses. Then, the thus-coated steel pipes were heated for about 5 minutes so that a maximum temperature of 150° C. was reached, thereby curing coatings. As a result, 14 kinds of surface-treated steel pipes whose coating thicknesses ranging from 0.5 $\mu$m to 137$\mu$m as shown in Table 1 were obtained.

The glass transition temperature of coating was found to be 35° C. to 110° C. as a result of measurement of viscoelasticity. The pencil hardness of coating was 3H.

Figure 3A:
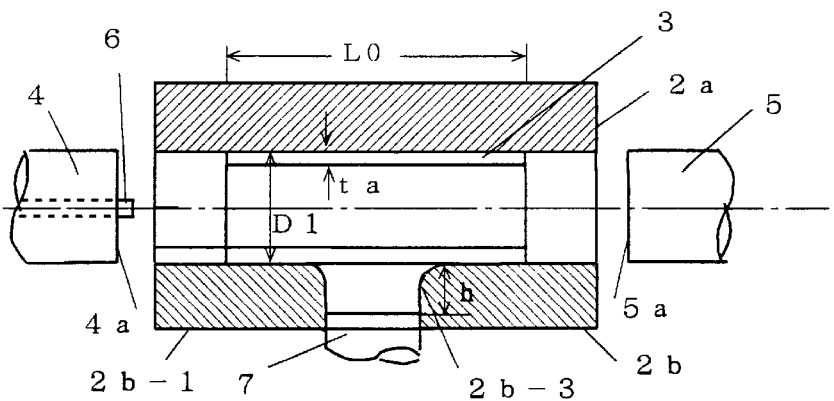
FIG. 3A is a partial sectional view showing a step of hydroforming a T piece.
Figure 3B:
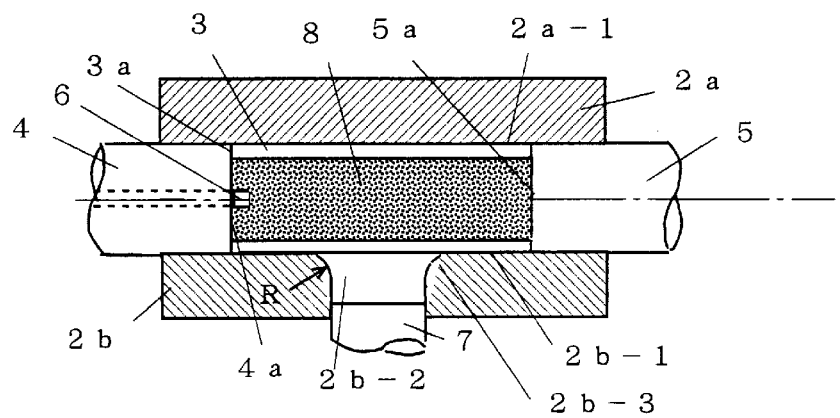
FIG. 3B is a partial sectional view showing a step of hydroforming a T piece.
Figure 3C:
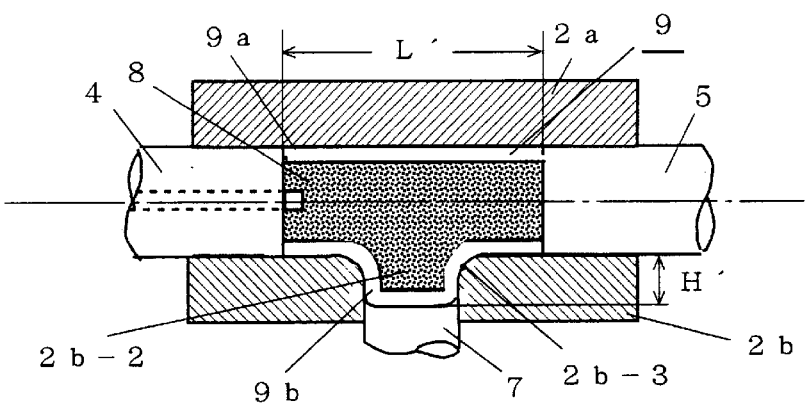
FIG. 3C is a partial sectional view showing a step of hydroforming a T piece.
Figure 3D:
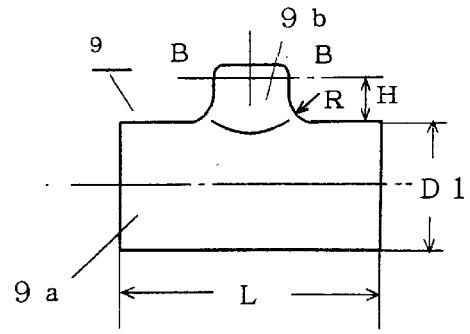
FIG. 3D is a side view showing a semifinished T piece.
Figure 4:
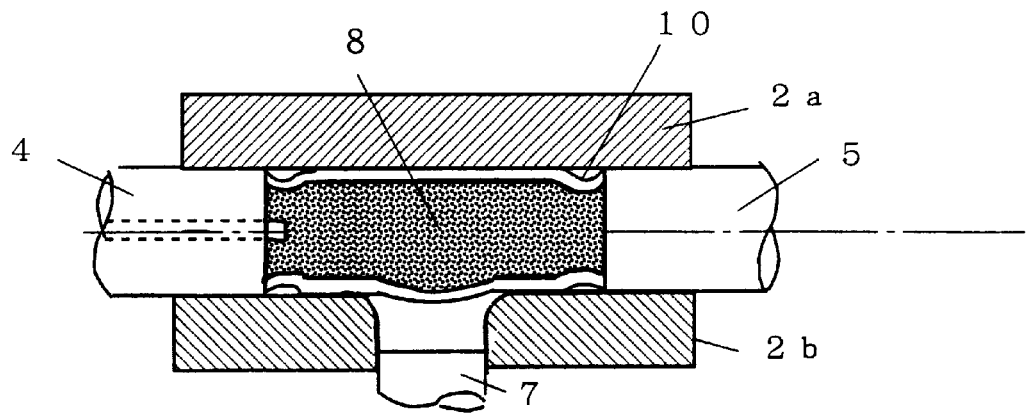
FIG. 4 is a partial sectional view showing a buckled tubular blank.

These coated steel pipes were cut into tubular blanks, each having a length L$_0$ (FIG. 3A) of 300 mm. Each of the thus-obtained tubular blanks was set in the dies of a hydroforming machine. Next, as shown in FIG. 3B, a hydraulic fluid (an emulsion prepared by mixing water with rust preventive oil in a concentration of 3%) was injected into the tubular blank. Thereafter, as shown in FIG. 3C, the tubular blank was axially compressed, while a maximum internal pressure of 500 kgf/cm$^2$ was applied thereto, to thereby hydroform the tubular blank. The target dimensions of a semifinished product 9 shown in FIG. 3D are as follows: a trunk (9$a$) has an outer diameter (D1) of 89.1 mm and a length (L') of 180 mm; and a projected portion (9$b$) has an outer diameter (D2) of 89.1 mm and a height (H') of 65 mm. For each coating thickness, 10 tubular blanks were continuously hydroformed.

The thus-obtained T pieces were examined for cracking, scratches, and the exfoliation of a resin coating. The results are shown in Table 1.

TABLE 1

| Sample No. | Type of coating | Glass transition temp. ° C. | Coating thickness (microns) | Cracking (occurrences) | Scratches (occurrences) | Exfoliation of coating (occurrences) | Remarks |
|---|---|---|---|---|---|---|---|
| 1-1 | Acrylic | 110 | 0.5* | 5 | 10 (major) | 10 | Com. Example |
| 1-2 | Acrylic | 110 | 1 | 0 | 10 (minor) | 0 | Example |
| 1-3 | " | " | 4 | 0 | 0 | 0 | |
| 1-4 | | " | 12 | 0 | 0 | 0 | |
| 1-5 | | " | 28 | 0 | 0 | 0 | |
| 1-6 | | " | 71 | 0 | 0 | 0 | |
| 1-7 | | " | 95 | 0 | 0 | 0 | |
| 1-8 | | 40 | 31 | 0 | 8 (minor) | 0 | |
| 1-9 | | 60 | 35 | 0 | 0 | 0 | |
| 1-10 | | 80 | 29 | 0 | 0 | 0 | |
| 1-11 | | 90 | 32 | 0 | 0 | 0 | |
| 1-12 | | 120 | 35 | 0 | 0 | 2 (minor) | |
| 1-13 | Acrylic | 110 | 108 | 0 | 0 | 2 | Com. |
| 1-14 | | " | 137 | 0 | 0 | 10 | Example |

*: Outside the range of the present invention

Figure 5:
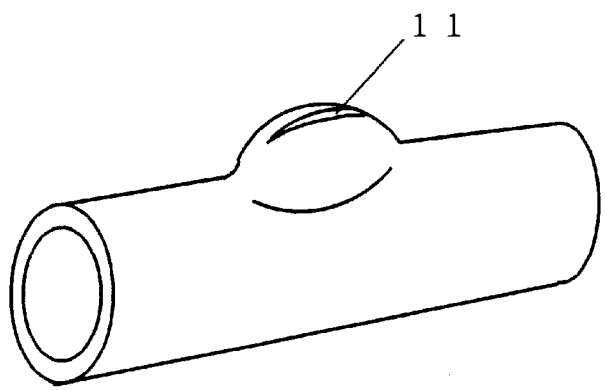
FIG. 5 is a perspective view showing a semifinished product whose projected portion is cracked.

In the Comparative Example having a thin coating thickness of 0.5 μm (No. 1—1), cracking as shown in FIG. 5 frequently occurred. Also, since noticeable scratches were formed on the outer surface of a hydroformed, semifinished product, the dies had to be polished after three of 10 hydroforming processes.

By contrast, in the Comparative Examples having a thick coating thickness in excess of 100 μm (Nos. 1-13 and 1-14), a coating exfoliated, so that the dies had to be cleaned each time exfoliation of coating occurred. Also, since exfoliations of coating caused dimple defects to be formed in the surfaces of tubular blanks, the outer surfaces of semifinished products had to be polished through use of a grinder.

For a coating thickness ranging from 1 μm to 100 μm (No. 1-2 to No. 1-12), semifinished products were all nondefective. T pieces were obtained from them by the following machining: the projected portion 9b of the semifinished product 9 shown in FIG. 3D was cut to a height H of 41.2 mm, and the ends of the trunk 9a were cut away to obtain a length L (FIG. 1) of 171.4 mm. As seen from the above results, an appropriate thickness of an acrylic coating ranges from 1 μm to 100 μm

EXAMPLE 2

Eleven (11) seam welded steel pipes (outer dia. 89.1 mm, thickness 4.2 mm, length 5.5 m) manufactured from hot-rolled steel strip (carbon steel: C 0.05%, Si 0.1%, Mn 0.25%) were acid cleaned and were then coated with an aqueous urethane coating material through use of a spray. The steel pipes were coated in different thicknesses. Then, the thus-coated steel pipes were heated to a temperature of about 100° C. through use of hot air, thereby drying coatings. As a result, the steel pipes whose coating thicknesses ranged from 0.3 μm to 49.2 μm as shown in Table 2 were obtained. The glass transition temperature of coating was 80° C. The pencil hardness of coating was H.

Hydroforming was performed in a manner similar to that of Example 1 to evaluate formability. The results are shown in Table 2.

TABLE 2

| Sample No. | Type of coating | Glass transition temp. ° C. | Coating thickness (microns) | Cracking (occurrences) | Scratches (occurrences) | Exfoliation of coating (occurrences) | Remarks |
|---|---|---|---|---|---|---|---|
| 2-1 | Urethane | 80 | 0.3* | 8 | 10 (major) | 10 | Com. |
| 2-2 | | " | 0.8* | 3 | 10 (major) | 0 | Example |
| 2-3 | Urethane | 80 | 1.5 | 0 | 10 (minor) | 0 | Example |
| 2-4 | | " | 3.5 | 0 | 0 | 0 | |
| 2-5 | | " | 7.8 | 0 | 0 | 0 | |
| 2-6 | | " | 12.5 | 0 | 0 | 0 | |
| 2-7 | | " | 25.1 | 0 | 0 | 0 | |
| 2-8 | | " | 37.9 | 0 | 0 | 2 | |
| 2-9 | | " | 49.2 | 0 | 0 | 0 | |
| 2-10 | | 90 | 1.5 | 0 | 10 (minor) | 0 | |
| 2-11 | | 120 | 1.5 | 0 | 8 (minor) | 5 (minor) | |

*: Outside the range of the present invention

For a coating thickness of 0.3 μm and 0.8 μm, 10 tubular blanks failed to be properly hydroformed. For a coating thickness of 1.5 μm, minor scratches were observed on the surfaces of 10 hydroformed products, which, however, were properly hydroformed.

As seen from the above results, when a urethane resin coating has a thickness of not less than 1 μm, hydroforming is enabled.

EXAMPLE 3

10 seam welded steel pipes (outer dia. 89.1 mm, thickness 4.2 mm, length 5.5 m) manufactured from hot-rolled steel strip of carbon steel (C 0.05%. Si 0.1%, Mn 0.25%) having a thickness of 4.2 mm and from hot-rolled steel strip of austenitic stainless steel (Cr 18%, Ni 8%) were acid cleaned. Stainless steel pipes further underwent blast treatment. Some of these steel pipes were coated with a resin through use of a spray without subjecting to chromate treatment, and the remaining steel pipes were chromate-treated and then coated with a resin.

Resins used, the thickness of a resin coating, and the amount of applied chromate are shown in Table 3.

These coated steel pipes were cut into tubular blanks, each having a length $L_0$ (FIG. 3A) of 300 mm. Each of the thus-obtained tubular blanks was set in the dies of a hydroforming machine. Next, as shown in FIG. 3B, a hydraulic fluid (an emulsion prepared by mixing water with rust preventive oil in a concentration of 3%) was injected into the tubular blank. Thereafter, as shown in FIG. 3C, the tubular blank was axially compressed, while a maximum internal pressure of 700 kgf/cm² was applied thereto, to thereby hydroform the tubular blank.

The target dimensions of a semifinished product 9 shown in FIG. 3D are as follows: a trunk (9a) has an outer diameter (D1) of 89.1 mm and a length (L') of 180 mm, and a projected portion (9b) has an outer diameter (D2) of 89.1 mm and a height (H') of 65 mm.

For each of samples Nos. 3-1 to 3-10, 10 tubular blanks were continuously hydroformed.

The thus-obtained T pieces were observed for cracking, scratches, and the exfoliation of a resin coating. The results are shown in Table 3.

tion treatment solutions using five kinds of resins (Table 4) as binder resins. The thus-treated steel pipes were dried in an oven at 100° C., thereby obtaining surface-treated steel pipes for hydroforming use having various coating thicknesses as shown in Table 5.

The thickness of coating was adjusted through control of time of immersion in a resin solution.

TABLE 4

| Symbol of resin | Monomer composition (wt. %) | | | | | | Characteristics | |
|---|---|---|---|---|---|---|---|---|
| | AA | MAA | MMA | OA | BA | EHMA | Acid value | Tg/° C. |
| a | 8 | 0 | 52 | 40 | 0 | 0 | 62 | 12 |
| b | 8 | 0 | 52 | 0 | 40 | 0 | 62 | 20 |
| c | 8 | 0 | 52 | 0 | 30 | 10 | 62 | 34 |
| d | 0 | 10 | 70 | 0 | 20 | 0 | 65 | 64 |
| e | 8 | 0 | 52 | 0 | 0 | 40 | 62 | 83 |

AA: Acrylic acid
MAA: Methacrylic acid
MMA: Methyl methacrylate
OA: Octyl acrylate
BA: Butyl acrylate
EHMA: 2-Ethylhexylmethacrylate These surface-treated steel pipes were cut into tubular blanks, each having a length $L_0$ (FIG. 3A) of 300 mm. As shown in FIG. 3B, a hydraulic fluid (an emulsion prepared by mixing water with rust preventive oil in a concentration of 3%) was injected into a tubular blank. Thereafter, as shown in FIG. 3C, the tubular blank was axially compressed, while a maximum internal pressure of 500 kgf/cm² was applied thereto, to thereby hydroform the tubular blank.

The target dimensions of a semifinished product 9 shown in FIG. 3D are as follows: a trunk (9a) has an outer diameter

TABLE 3

| Sample No. | Material of steel pipe | Type of coating | Amount of applied chromate (mg/m2*) | Coating thickness (microns) | Hydroformed products suffering defects | | | Remarks |
|---|---|---|---|---|---|---|---|---|
| | | | | | Cracking (occurrences) | Scratches (occurrences) | Exfoliation of coating (occurrences) | |
| 3-1 | Carbon steel | Polyester | 0 | 1.5 | 0 | 10 (major) | 0 | Example |
| 3-2 | | " | 11 | 1.5 | 0 | 0 | 0 | |
| 3-3 | | Acrylic | 11 | 1.5 | 0 | 0 | 0 | |
| 3-4 | | Urethane | 11 | 1.5 | 0 | 0 | 0 | |
| 3-5 | Stainless steel | Polyester | 0 | 1.5 | 0 | 10 (minor) | 0 | |
| 3-6 | | " | 0 | 7.8 | 0 | 0 | 0 | |
| 3-7 | | " | 11 | 1.5 | 0 | 0 | 0 | |
| 3-8 | | " | 490 | 1.5 | 0 | 0 | 0 | |
| 3-9 | | Acrylic | 11 | 1.5 | 0 | 0 | 0 | |
| 3-10 | | Urethane | 11 | 1.5 | 0 | 0 | 0 | |

For samples Nos. 3-1 and 3-5 having a resin coating thickness of 1.5 µm and having no chromate coating, scratches were somewhat formed, but were to such a degree as not to affect actual use. For chromate-treated samples Nos. 3-2 and 3-7 having a resin coating thickness of 1.5 µm did not suffer any scratches, indicating the effect of chromate treatment.

EXAMPLE 4

Twenty four (24) seam welded steel pipes (outer dia. 89.1 mm, thickness 4.2 mm, length 5.5 m) manufactured from hot-rolled steel strip (carbon steel: C 0.05%, Si 0.1%, Mn 0.25%) were acid cleaned and then subjected to blast treatment. Thereafter, the steel pipes were immersed in lubrica- (D1) of 89.1 mm and a length (L') of 180 mm; and a projected portion (9b) has an outer diameter (D2) of 89.1 mm and a height (H') of 65 mm.

For each of samples Nos. 1—1 to 4-6 shown in Table 5, 10 tubular blanks were continuously hydroformed.

The outer surfaces of the thus-obtained T pieces were observed for cracking, scratches, and the exfoliation of a resin coating. The results are shown in Table 5.

TABLE 5

| Sample No. | Symbol of coating (Table 4) | Coating thickness (microns) | Cracking (occurrences) | Scratches (occurrences) | Indentations (occurrences) | Remarks |
|---|---|---|---|---|---|---|
| 1-1 | a | 0.2* | 4 | 10 (major) | 0 | Com. Example |
| 1-2 | " | 0.5 | 0 | 10 (minor) | 0 | Example |
| 1-3 | " | 1.5 | 0 | 0 | 0 | |
| 1-4 | " | 5.8 | 0 | 0 | 0 | |
| 1-5 | " | 9.4 | 0 | 0 | 0 | |
| 1-6 | " | 17.1* | 0 | 0 | 3 (major) | Com. |
| 2-1 | b | 0.3* | 5 | 10 (major) | 0 | Example |
| 2-2 | " | 0.5 | 0 | 10 (minor) | 0 | Example |
| 2-3 | " | 2.5 | 0 | 0 | 0 | |
| 2-4 | " | 5.8 | 0 | 0 | 0 | |
| 2-5 | " | 9.2 | 0 | 0 | 0 | |
| 2-6 | " | 14.3* | 0 | 0 | 4 (major) | Com. |
| 3-1 | c | 0.1* | 3 | 10 (major) | 0 | Example |
| 3-2 | " | 0.6 | 0 | 10 (minor) | 0 | Example |
| 3-3 | " | 0.9 | 0 | 0 | 0 | |
| 3-4 | " | 4.2 | 0 | 0 | 0 | |
| 3-5 | " | 7.3 | 0 | 0 | 0 | |
| 3-6 | " | 12.3* | 0 | 0 | 3 (major) | Com. |
| 4-1 | d | 0.1* | 7 | 10 (major) | 0 | Example |
| 4-2 | " | 0.7 | 0 | 10 (minor) | 0 | Example |
| 4-3 | " | 1.5 | 0 | 0 | 0 | |
| 4-4 | " | 5.8 | 0 | 0 | 0 | |
| 4-5 | " | 10.0 | 0 | 0 | 0 | |
| 4-6 | e | 20.2* | 0 | 0 | 5 (major) | Com. Example |

*: Outside the range of the present invention

Cracking in the projected portion as shown in FIG. 5 occurred frequently for the following thicknesses of coating: 0.2 μm (sample No. 1—1) for resin a lubrication treatment; 0.3 μm (sample No. 2-1) for resin b lubrication treatment; 0.1 μm (sample No. 3-1) for resin c lubrication treatment; and 0.1 μm (sample No. 4-1) for resin d lubrication treatment.

Also, since noticeable scratches were formed on the outer surface of a hydroformed semifinished product, the dies had to be polished after three of 10 hydroforming processes.

By contrast, a coating exfoliated for the following thicknesses of coating: 17.1 μm (sample No. 1-6) for resin a lubrication treatment; 14.3 μm (sample No. 2-6) for resin b lubrication treatment; 12.3 μm (sample No. 3-6) for resin c lubrication treatment; and 20.2 μm (sample No. 4-6) for resin d lubrication treatment. Thus, the dies had to be cleaned each time the exfoliation of coating occurred. Also, since exfoliations of coating caused dimple defects to be formed in the surfaces of tubular blanks, the outer surfaces of semifinished products had to be polished through use of a grinder.

For a coating thickness ranging from 0.5 μm to 10 μm with four kinds of removable resin coatings (samples Nos. 1-2 to 1-5, 2—2 to 2-5, 3-2 to 3-5, and 5), semi shed products were all non-defective. T pieces 1 were obtained from them by the following machining: the projected portion 9b of the semifinished product 9 shown in FIG. 3D was cut to a height H of 41.2 mm, and the ends of the trunk 9a were cut away to obtain a length L (FIG. 1) of 171.4 mm.

As described above, a surface-treated steel pipe of the present invention is prepared by forming an organic coating on a long steel pipe. Accordingly, hydroforming can be performed immediately after the surface-treated steel pipe is cut into tubular blanks. This does not involve a degreasing and cleaning step and a coating and diving step which have been conventionally practiced for each tubular blank, so that the hydroforming process is significantly simplified. Further, since a resin coating can be stably formed to a uniform thickness, the galling between dies and an object material can be prevented in hydroforming, thereby suppressing the occurrence of defects such as cracking and buckling. Also, since man-hours involved in repairing dies and removing scratches from the surface of a hydroformed product are significantly reduced, productivity improves greatly.

For a steel pipe of the present invention coated with a removable resin coating, the coating can be easily removed through use of an ordinary alkali aqueous solution; in other words, removing the coating does not require to use flon and like solvents whose use is regulated.

What is claimed is:

1. A lubricant surface-treated steel pipe for use in hydroforming, which comprises a lubricating organic resin coating provided on at least an outer surface of the steel pipe, wherein the resin has a glass transition temperature of 40° C. to 120° C. and is selected from the group consisting of acrylic, urethane, polyester, and epoxy resins, and wherein the coating has a thickness of 1 μm to 100 μm.

2. A steel pipe according to claim 1, wherein the lubricating organic resin coating is provided on a pre-treatment layer which is provided on at least an outer surface of the steel pipe.

3. A steel pipe according to claim 2, wherein the pre-treatment layer is zinc phosphate applied in an amount of not greater than 1 g/m$^2$.

4. A steel pipe according to claim 2, wherein the pre-treatment layer is iron phosphate applied in an amount of not greater than 0.3 g/m$^2$.

5. A steel pipe according to claim 2, wherein the pre-treatment layer is a chromate applied in an amount of not greater than 500 mg/m$^2$ as metallic chromium.

6. A steel pipe according to claim 1, wherein the thickness of the organic resin coating is from 30 μm to 90 μm.

7. A steel pipe according to claim 1, wherein the organic resin coating contains either one or both of polyethylene wax and fluoroplastic grains as an organic lubricant in an amount of from 0.5% to 20% by weight.

8. Steel structural components formed from the lubricant surface-treated steel pipe according to claim 1.

9. A lubricant surface-treated steel pipe for use in hydroforming, which comprises a lubricating organic resin coating provided on at least an outer surface of said steel pipe, wherein the resin has a glass transition temperature of 5° C. to 100° C. and is selected from the group consisting of vinyl resins, carboxyl-group-containing vinyl copolymers having an acid value of 10 to 160, esters or amides of said vinyl resins, homopolymers of polyacrylic acid or polyacrylic acid esters, and copolymers of these resins and other resins that are copolymerizable therewith, and wherein the coating has a thickness of 0.5 $\mu$m to 10 $\mu$m.

10. A steel pipe according to claim 9, wherein said organic resin coating is soluble or dispersible in an alkali aqueous solution.

11. A method for hydroforming a steel pipe, comprising providing at least an outer surface of a steel pipe with a lubricating organic resin coating and performing hydroforming of said steel pipe, wherein the resin coating has a glass transition temperature of 40° C. to 120° C. and a thickness of 1 $\mu$m to 100 $\mu$m and is selected from the group consisting of acrylic, urethane, polyester, and epoxy resins.

12. A method for hydroforming a steel pipe, comprising providing at least an outer surface of a steel pipe with a lubricating organic resin coating and performing hydroforming of said steel pipe, wherein the resin coating has a glass transition temperature of 40° C. to 120° C. and a thickness of 1 $\mu$m to 100 $\mu$m and is selected from the group consisting of vinyl resins, carboxyl-group-containing vinyl copolymers having an acid value of 10 to 160, esters or amides of said vinyl resins, homopolymers of polyacrylic acid or polyacrylic acid esters, and copolymers of these resins and other resins that are copolymerizable therewith.

* * * * *